(12) United States Patent
Kiriyama et al.

(10) Patent No.: US 7,688,871 B2
(45) Date of Patent: Mar. 30, 2010

(54) METHOD OF INCREASING THE CONTRAST OF A HIGH-INTENSITY LASER

(75) Inventors: Hiromitsu Kiriyama, Kyoto (JP); Michiaki Mori, Kyoto (JP); Shuji Kondo, Kyoto (JP); Shuhei Kanazawa, Kyoto (JP); Hiroyuki Daido, Kyoto (JP)

(73) Assignee: Japan Atomic Energy Agency, Ibaraki (JP)

( * ) Notice: Subject to any disclaimer, the term of this patent is extended or adjusted under 35 U.S.C. 154(b) by 108 days.

(21) Appl. No.: 12/155,321

(22) Filed: Jun. 2, 2008

(65) Prior Publication Data

US 2008/0304523 A1    Dec. 11, 2008

(30) Foreign Application Priority Data

Jun. 1, 2007    (JP)    ............... 2007-146492

(51) Int. Cl.
*H01S 3/10*    (2006.01)
(52) U.S. Cl. .................................... 372/20; 372/25
(58) Field of Classification Search .......... 372/20, 372/22, 3, 25; 359/188
See application file for complete search history.

(56) References Cited

U.S. PATENT DOCUMENTS

| 5,377,211 | A | * | 12/1994 | Kong et al. | ............... 372/3 |
| 5,648,976 | A | * | 7/1997 | Franck et al. | ............... 372/25 |
| 5,898,714 | A | * | 4/1999 | Morita et al. | ............... 372/6 |
| 6,751,240 | B2 | * | 6/2004 | Arisawa et al. | ............... 372/3 |
| 7,072,367 | B2 | * | 7/2006 | Arisawa et al. | ............... 372/3 |

FOREIGN PATENT DOCUMENTS

| JP | 2002-62553 | 2/2002 |
| JP | 2003-270551 | 9/2003 |
| JP | 2006-229079 | 8/2006 |

OTHER PUBLICATIONS

"Stabilization of Optical Parametric Chirped Pulse Amplification", Journal of the Japan Society of Mechanical Engineers, Nov. 2006, vol. 109, No. 1056, p. 38.

* cited by examiner

*Primary Examiner*—Minsun Harvey
*Assistant Examiner*—Tuan N. Nguyen

(57) ABSTRACT

In the improved method for increasing the contrast of a high-intensity laser, signal light outputted from a laser oscillator, a preamplifier or the like is amplified by OPCPA which is excited by pump light having a short pulse width comparable to that of the signal light, thereby producing an extremely high contrast.

7 Claims, 4 Drawing Sheets

METHOD OF INCREASING THE CONTRAST OF A HIGH-INTENSITY LASER

CROSS REFERENCE TO RELATED APPLICATIONS

This application claims the benefit of Japanese Application Number 2007-146492, filed with the Japanese Intellectual Property Office on Jun. 1, 2007, the disclosure of which is incorporated herein by reference.

BACKGROUND OF THE INVENTION

1. Technical Field

This invention relates to a method of increasing the contrast of a high-intensity laser by using optical parametric chirped pulse amplification (OPCPA) in which energy is transferred in a nonlinear optical crystal from pump light to signal light and idler light. The method of the present invention for increasing the contrast of a high-intensity laser is such that signal light outputted from a laser oscillator, a preamplifier or the like is amplified by OPCPA which is excited by pump light having a short pulse width comparable to that of the signal light, thereby producing high-intensity laser light of an extremely high contrast.

2. Background Art

As FIGS. 1 and 2 show, when signal light 1 at a frequency of $\omega s$ and a wavenumber vector of ks and pump light 2 at a frequency of $\omega p$ and a wavenumber vector of kp are simultaneously launched into a nonlinear optical crystal 3 such as a beta-barium borate crystal, idler light is generated at a frequency of $\omega i$ and a wavenumber vector of ki. When pump light is launched into a nonlinear optical crystal, there occurs light oscillation at two wavelengths and the light at the shorter wavelength is called signal light whereas the longer wavelength of light is called idler light. Since the idler light is discarded in the present invention, it is not shown in FIGS. 1 and 2.

It is known that if the following equations hold between those parameters, the signal and the idler light are amplified by the energy they obtain from the pump light. This phenomenon is called an optical parametric effect in which energy is transferred in the nonlinear optical crystal from the pump light to the signal and the idler light; in the case where chirped pulsed light is used as the signal light, the phenomenon is specifically called optical parametric chirped pulse amplification (OPCPA). Chirped pulsed light is pulsed laser light that is temporally stretched by providing it with spectral dispersion (making the optical path shorter at the shorter wavelength than at the longer wavelength) by means of a pulse stretcher using a diffraction grating and the like.

$\omega p = \omega s + \omega i$ $kp = ks + ki$

In the case where weak signal light as outputted from a laser oscillator or the like is to be amplified with an optical parametric chirped pulse amplifier (OPCPA), pump light that has a comparatively long pulse width of about 10 ns and which finds extensive use in commercial products is used as excitation light. Since the signal light usually has a time duration of 1 ns or less, temporal overlap between the signal and the pump light is poor as shown in FIG. 1, in which they are indicated by 1 and 2, respectively. As shown in FIG. 2, the signal light 1 is amplified by obtaining energy from the pump light 2 so as to grow into a high-energy pulse (main pulse 5). However, due to the poor temporal overlap between the signal and the pump light, unwanted background light (pre-pulse 6) is amplified in the area where there is no overlap with the signal light. As a result, a contrast which is approximately eight orders of magnitude is obtained in the ns temporal region (meaning the intensity ratio between the pre-pulse and the main pulse is approximately eight orders of magnitude).

With the recent advances in the high-intensity laser generating technology, laser light has been realized that provides a focusing intensity of $10^{20}$ W/cm$^2$. Hence, without a contrast of at least ten orders of magnitude, the main pulse with high intensity will break the target material before it interacts with the substance of interest and at the same time a preliminary plasma is formed to prevent interaction between the main pulse and a solid substance such as a thin metal film. Therefore, the contrast that can be achieved by this method has been inadequate. As another problem, the pump light in the area where it does not overlap the signal light makes no contribution to amplifying the main pulse, causing a disadvantage of low efficiency of energy conversion.

Known documents in the art include three patent documents and one non-patent document; the patent documents are one that relates to a method of improving the contrast of laser light and a laser apparatus that uses the method (JP 2006-229079 A), one that relates to a method and apparatus for controlling laser pulses, as well as a method and apparatus for generating X-rays (JP 2003-270551 A), and one that relates to a method and apparatus for compressing optical pulses (JP 2002-62553 A); the non-patent document is one that relates to "stabilization of optical parametric chirped pulse amplification" (Journal of the Japan Society of Mechanical Engineers, Vol. 109, No. 1056, November 2006). However, these documents have nothing to do with the present invention in which signal light outputted from a laser oscillator, a preamplifier or the like is amplified by OPCPA which is excited by pump light having a short pulse width comparable to that of the signal light, thereby producing high-intensity laser light of an extremely high contrast.

SUMMARY OF THE INVENTION

An object of the present invention is to provide a method by which an extremely high contrast can be generated in a high-intensity laser in an efficient and convenient way.

The above-mentioned JP 2006-229079 A relates to a method of improving the contrast of laser light and a laser apparatus that uses the method; however, this document does not concern the contrast between the main pulse and the background light but simply compares the main pulse with the preceding pulse. The above-mentioned JP 2003-270551 A relates to a method and apparatus for controlling laser pulses, as well as a method and apparatus for generating X-rays; this document describes spatial control rather than temporal control. The above-mentioned JP 2002-62553 A relates to a method and apparatus for compressing optical pulses; however, this document concerns improving the contrast using a nonlinear reflection of light rather than using amplification of light. Furthermore, Journal of the Japan Society of Mechanical Engineers, Vol. 109, No. 1056, November 2006 relates to stabilization of optical parametric chirped pulse amplification; however, this document does not deal with contrast but focuses on stabilization.

Having been accomplished to solve the aforementioned problems of the prior art, the method of the present invention for increasing the contrast of a high-intensity laser is characterized in that signal light outputted from a laser oscillator, a preamplifier or the like is amplified by OPCPA which is excited by pump light having a short pulse width comparable to that of the signal light, thereby producing an extremely high contrast.

DETAILED DESCRIPTION OF THE INVENTION

Figure 5:
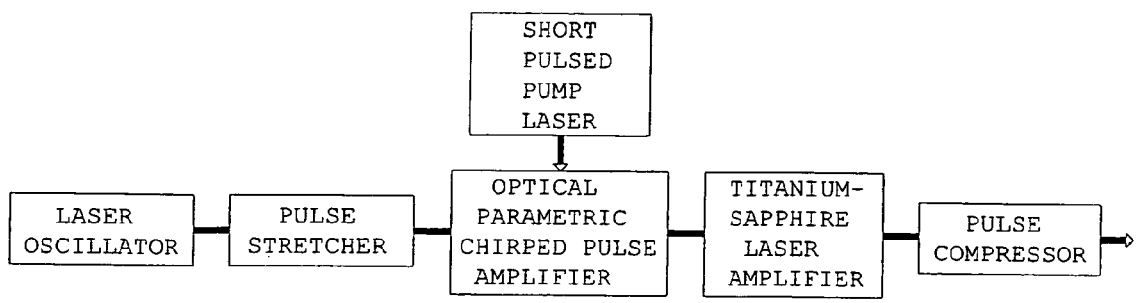
FIG. 5 is a diagram showing the system layout of the present invention.

FIG. 5 shows the apparatus used in the present invention to increase the contrast of a high-intensity laser and it comprises a laser oscillator, a pulse stretcher, an optical parametric chirped pulse amplifier, a titanium-sapphire laser amplifier, and a pulse compressor. Signal light as outputted from the laser oscillator is launched into the pulse stretcher, typically comprising a diffraction grating, where it undergoes spectral dispersion and the resulting light is launched into the optical parametric chirped pulse amplifier as excited by short pulsed pumping laser light and only the main pulse in the light is amplified; subsequently, the amplified pulse output is further amplified in the titanium-sapphire amplifier and then subjected to pulse compression in the pulse compressor, whereupon laser light of high intensity and contrast is outputted.

In the apparatus of the present invention, the output light from the laser oscillator has a very broad spectral width (contains a lot of waves) and if it is launched into the pulse stretcher, it undergoes spectral dispersion (making the optical path shorter at the shorter wavelength than at the longer wavelength) to create chirped pulsed light which is temporally stretched light. On the other hand, the output light from the laser oscillator which has a broad spectral width is very short in time duration. The peak intensity of the laser is determined by energy divided by time, so if that output light is directly amplified by the laser amplifier, it becomes unduly intense to break the optical devices in the process of amplification. To deal with this problem, the pulse stretcher is used to create chirped pulsed light which is temporally stretched in pulse width by a sufficient degree to reduce the peak intensity so that the light can be amplified up to a high-energy state without damaging the optical devices. After the amplification, the light is launched into the pulse compressor where it is subjected to dispersion which is reverse to what is effected in the pulse stretcher, whereupon the initial very short pulse width is restored. As the result of pulse compression, a short pulse width and high energy are attained, thus creating pulses of an extremely high peak intensity.

By adopting the technique of the present invention, high contrast can be attained in an efficient and convenient way. The thus obtained high-contrast signal light is launched into the amplifier at the latter stage of the multiple-stage amplifier for further amplification to thereby realize laser light with an extremely high contrast and an even higher intensity.

Figure 3:
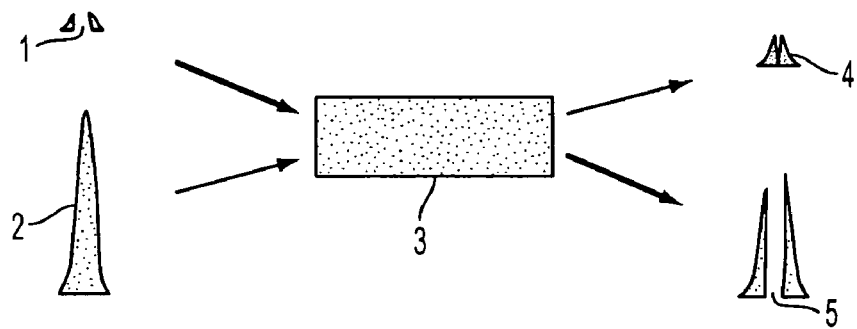
FIG. 3 is a diagram illustrating how OPCPA causes energy transfer between signal light and pump light in an embodiment of the present invention.
Figure 4A:
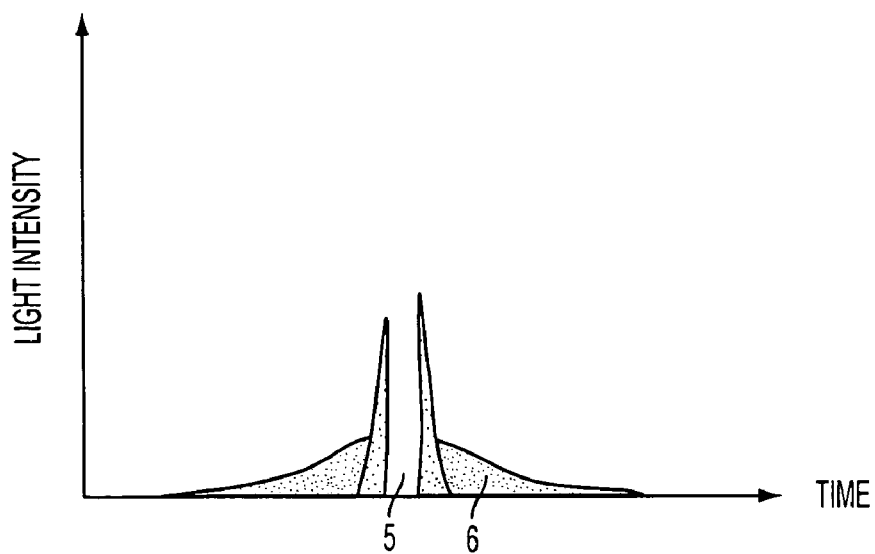
FIG. 4(a) is a graph showing the contrast obtained by the prior art method and FIG. 4(b) is a graph showing the contrast obtained by the present invention.
Figure 4B:
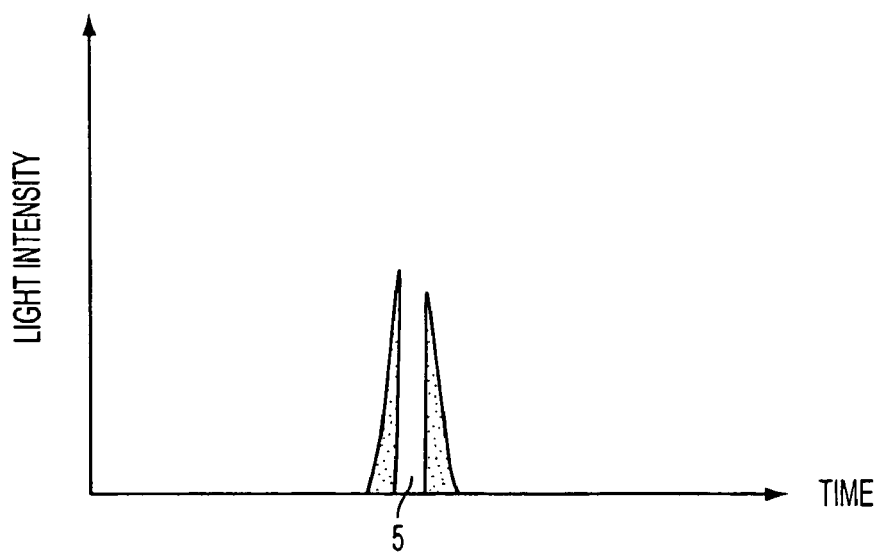

The method of the present invention for increasing the contrast of a high-intensity laser is described in detail with reference to accompanying drawings. FIG. 3 is a diagram illustrating how energy transfer occurs between signal light and pump light in OPCPA as an embodiment of the present invention. FIGS. 4(a) and 4(b) are graphs comparing the contrasts obtained by the prior art method and the present invention, respectively.

As shown in FIG. 3, the signal light 1 and the pump light 2 that are launched into the OPCPA 3 are adjusted to have the same time duration, whereby the pump light transfers its energy to the signal light only, whereupon the amplification of the pre-pulse is suppressed to achieve an extremely high contrast. Since the energy of the pump light 2 is transferred only to the signal light 1, less pump light energy is required to produce signal light of high enough energy, which contributes to an energy-efficient operation and a smaller system configuration. Excitation with pump light of a short pulse width offers the advantage that given the same energy, a higher intensity can be produced to shorten the length of interaction in OPCPA. Since the length of interaction is shortened, the overall size of the equipment can be reduced; as a further advantage, the amount of phase mismatch can be minimized to widen the spectral band of the signal light that can be amplified.

As is clear from FIGS. 4(a) and 4(b), the contrast obtained by the prior art method differs from the contrast obtained by the present invention in that a pre-pulse 6 is generated in the former method.

EXAMPLES

The present invention is hereunder described in greater detail by reference to the following example.

Figure 1:
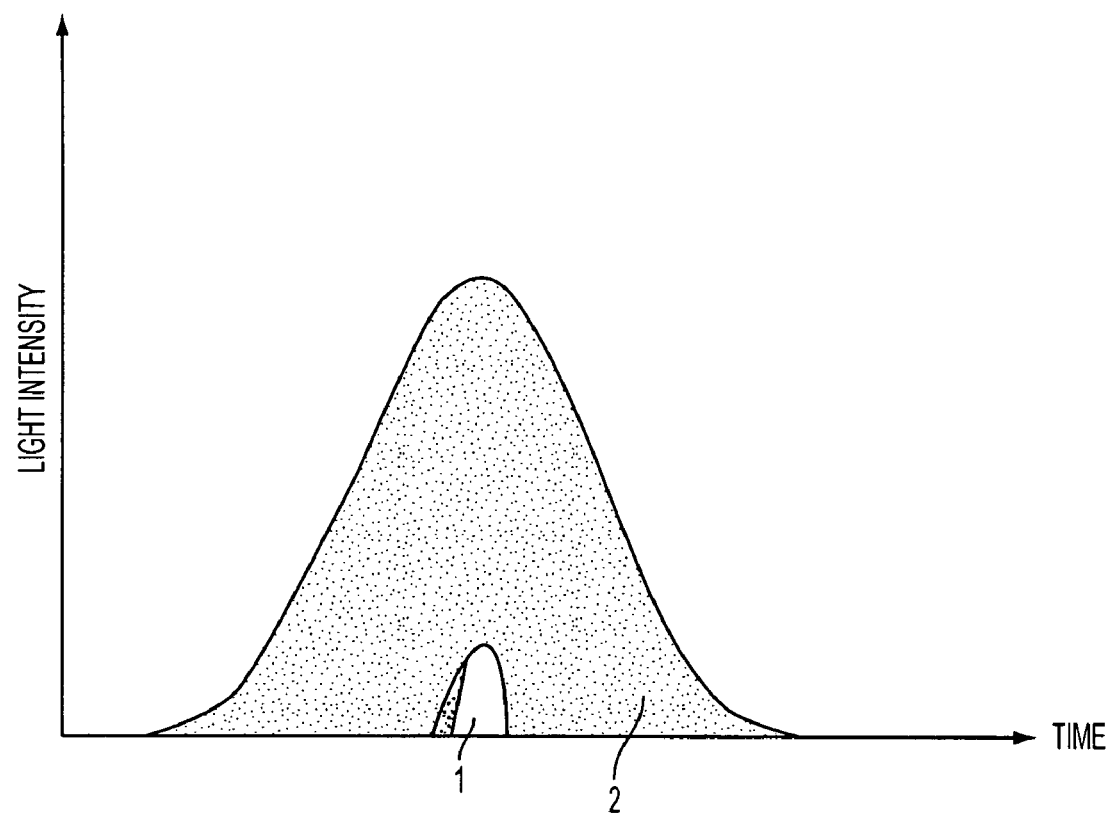
FIG. 1 is a graph showing a temporal relationship between signal light and pump light observed by OPCPA in the prior art.
Figure 2:
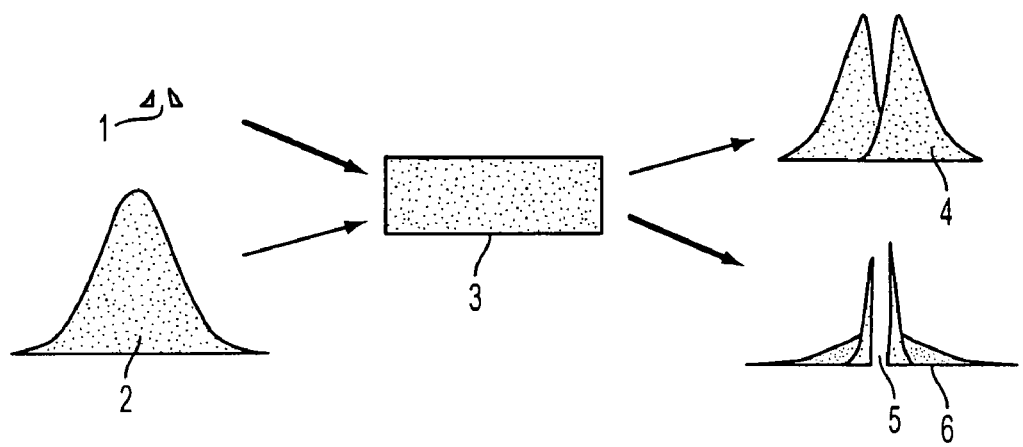
FIG. 2 is a diagram illustrating how OPCPA causes energy transfer between the signal light and the pump light in the prior art.

The contrast under investigation in the Example assumes the case that is shown schematically in FIG. 3; the signal light 1 was output light from the most commonly used titanium-sapphire laser oscillator having a central oscillation frequency of 800 nm, a power of 0.1 nJ and a contrast of eight orders of magnitude; the nonlinear optical crystal 3 for OPCPA was a BBO (beta-barium borate) crystal; and the pump light 2 was a second harmonic from a Nd:YAG laser oscillating at a wavelength of 532 nm. Also assume that the pump light in the prior art case (FIGS. 1 and 2) has a pulse width of 10 nm whereas the pump light in the Example has a pulse width of 20 ps. OPCPA is assumed to provide a gain of approximately eight orders of magnitude in amplification which is typical of the case under consideration. The process of optical parametric chirped pulse amplification (OPCPA) is given by the following equations:

$$\frac{du_1}{d\xi} = -u_1 u_3 \sin\theta,$$

$$\frac{du_2}{d\xi} = -u_1 u_3 \sin\theta,$$

$$\frac{\partial u_3}{\partial \xi} = +u_1 u_2 \sin\theta,$$

$$\frac{d\theta}{d\xi} = \Delta S + \left(\frac{u_1 u_2}{u_3} - \frac{u_3 u_2}{u_1} - \frac{u_3 u_2}{u_2}\right)\cos\theta,$$

$$W = I_1(0) + I_2(0) + I_3(0)\cos^2\beta,$$

$$\Delta S = \Delta kz/\xi,$$

$$\theta = \Delta k + \phi_3 - \phi_2 - \phi_1,$$

-continued $$u_1 = [I_1/(\omega_1 W)]^{1/2},$$

$$u_2 = [I_2/(\omega_2 W)]^{1/2},$$

$$u_3 = [I_3\cos^2\beta/(\omega_3 W)]^{1/2},$$

In the above equations, $u_1$, $u_2$ and $u_3$ represent the amplitudes of signal light, idler light and pump light, respectively; z represents the direction of light propagation; $I_1(0)$, $I_2(0)$ and $I_3(0)$ represent the initial intensities of the three waves at z=0; $\omega_1$, $\omega_2$ and $\omega_3$ each represent an angular velocity; $\Delta k=k_3-k_2-k_1$ represents the amount of phase mismatch between the three waves; β represents the walk-off angle of a pointing vector; and Φ represents the initial phase. The walk-off angle of a pointing vector is defined as follows: when light is launched into a nonlinear optical crystal at normal incidence, an extraordinary ray does not go straight like an ordinary ray but travels obliquely at an angle on account of the birefringence of the nonlinear crystal and this angle is called the walk-off angle.

Table 1 below shows the results of calculating the contrasts realized in the prior art method and in the Example. From the Table, it can be predicted that the prior art method provides a contrast of $1.1\times10^7$ whereas the method of the present invention provides a contrast of $5.4\times10^{15}$; thus, the method of the present invention assures a marked improvement in contrast over the prior art method, demonstrating the utility of the invention's technique. As another advantage, the crystal length is shorter than that required in the prior art method and this enables not only reduction in the overall size of equipment but also amplification of a wide spectral band. Furthermore, it is anticipated that the efficiency of conversion from the pump to the signal light can be improved markedly by a factor of at least ten.

TABLE 1

|  | Prior art method | Invention method |
|---|---|---|
| Contrast | $1.1 \times 10^7$ | $5.4 \times 10^{15}$ |
| Length of interaction [cm] | 4.4 | 0.7 |
| Pump-signal conversion efficiency [%] | 3.3 | 39 |
| Spectral band (FWHM) [nm] | 160 | 240 |

Table 1 shows the contrast, length of interaction, conversion efficiency and spectral band that are obtained by the prior art method, as compared with the contrast, length of interaction, conversion efficiency and spectral band that are obtained in the present invention.

What is claimed is:

1. A method of increasing the contrast of a high-intensity laser comprising:
    amplifying laser light outputted from a laser oscillator with an optical parametric chirped pulse amplifier as excited by laser light of a short pulse width, whereby the laser light is provided with an extremely high value of contrast which represents the intensity ratio between the pre-pulse as background light and the main pulse, both being contained in the temporal waveform of the laser light,
    wherein the laser light outputted from a laser oscillator is signal light and the laser light of a short pulse width is pump light,
    wherein excitation by pump light of a short pulse width enables efficient amplification by the short length of interaction in the optical parametric chirped pulse amplifier and, at the same time, the short length of interaction enables amplification of a wide spectral band, and
    wherein in a laser system comprising a laser oscillator, a pulse stretcher, a laser amplifier and a pulse compressor, signal light outputted from the laser oscillator has only the main pulse amplified selectively with an optical parametric chirped pulse amplifier as excited by pump light of a short pulse width and thereafter the amplified pulse is launched into an optical parametric chirped pulse amplifier as excited by pump light of a short pulse width or into another titanium-sapphire laser amplifier in the latter stage, whereby the amplified light can have a higher intensity.

2. The method of increasing the contrast of a high-intensity laser according to claim 1, wherein the pump light is generated by exciting a rare earth doped crystal, ceramics, glass or a fiber with a semiconductor laser or a laser diode excited solid-state laser, the generated pump light being subjected to mode locking to thereby acquire a temporally short pulse width.

3. The method of increasing the contrast of a high-intensity laser according to claim 1, wherein the optical parametric chirped pulse amplifier uses one or more nonlinear optical crystals and the signal light to be amplified is chirped pulsed light the frequency of which varies with time.

4. A method of increasing the contrast of a high-intensity laser comprising:
    amplifying laser light outputted from a laser oscillator with an optical parametric chirped pulse amplifier as excited by laser light of a short pulse width, whereby the laser light is provided with an extremely high value of contrast which represents the intensity ratio between the pre-pulse as background light and the main pulse, both being contained in the temporal waveform of the laser light,
    wherein the laser light outputted from a laser oscillator is signal light and the laser light of a short pulse width is pump light,
    wherein the pump light is generated by exciting a rare earth doped crystal, ceramics, glass or a fiber with a semiconductor laser or a laser diode excited solid-state laser, the generated pump light being subjected to mode locking to thereby acquire a temporally short pulse width, and
    wherein in a laser system comprising a laser oscillator, a pulse stretcher, a laser amplifier and a pulse compressor, signal light outputted from the laser oscillator has only the main pulse amplified selectively with an optical parametric chirped pulse amplifier as excited by pump light of a short pulse width and thereafter the amplified pulse is launched into an optical parametric chirped pulse amplifier as excited by pump light of a short pulse width or into another titanium-sapphire laser amplifier in the latter stage, whereby the amplified light can have a higher intensity.

5. The method of increasing the contrast of a high-intensity laser according to claim 4, wherein the optical parametric chirped pulse amplifier uses one or more nonlinear optical crystals and the signal light to be amplified is chirped pulsed light the frequency of which varies with time.

6. The method of increasing the contrast of a high-intensity laser according to claim 1, wherein the pump light is generated by exciting a rare earth doped crystal, ceramics, glass or a fiber with a semiconductor laser or a laser diode excited solid-state laser, the generated pump light being subjected to mode locking to thereby acquire a temporally short pulse width, and wherein the optical parametric chirped pulse amplifier uses one or more nonlinear optical crystals and the signal light to be amplified is chirped pulsed light the frequency of which varies with time.

7. A method of increasing the contrast of a high-intensity laser comprising:

amplifying laser light outputted from a laser oscillator with an optical parametric chirped pulse amplifier as excited by laser light of a short pulse width, whereby the laser light is provided with an extremely high value of contrast which represents the intensity ratio between the pre-pulse as background light and the main pulse, both being contained in the temporal waveform of the laser light, wherein the laser light outputted from a laser oscillator is signal light and the laser light of a short pulse width is pump light, wherein the optical parametric chirped pulse amplifier uses one or more nonlinear optical crystals and the signal light to be amplified is chirped pulsed light the frequency of which varies with time, and wherein in a laser system comprising a laser oscillator, a pulse stretcher, a laser amplifier and a pulse compressor, signal light outputted from the laser oscillator has only the main pulse amplified selectively with an optical parametric chirped pulse amplifier as excited by pump light of a short pulse width and thereafter the amplified pulse is launched into an optical parametric chirped pulse amplifier as excited by pump light of a short pulse width or into another titanium-sapphire laser amplifier in the latter stage, whereby the amplified light can have a higher intensity.

* * * * *